(12) United States Patent
Tanimoto

(10) Patent No.: US 9,004,772 B2
(45) Date of Patent: Apr. 14, 2015

(54) ROLLING BEARING UNIT

(71) Applicant: JTEKT Corporation, Osaka-shi, Osaka (JP)

(72) Inventor: Kiyoshi Tanimoto, Kashiwara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/211,672

(22) Filed: Mar. 14, 2014

(65) Prior Publication Data

US 2014/0286602 A1     Sep. 25, 2014

(30) Foreign Application Priority Data

Mar. 21, 2013    (JP) .................................. 2013-058631

(51) Int. Cl.
*F16C 33/66*          (2006.01)

(52) U.S. Cl.
CPC ......... *F16C 33/6614* (2013.01); *F16C 33/6611* (2013.01); *F16C 33/6625* (2013.01)

(58) Field of Classification Search
USPC ................................................ 384/473, 469
See application file for complete search history.

(56) References Cited

U.S. PATENT DOCUMENTS

| | | | | |
|---|---|---|---|---|
| 947,529 | A | * | 1/1910 | Meston .......................... 384/469 |
| 4,576,489 | A | * | 3/1986 | Bentele et al. ................. 384/469 |
| 2011/0206306 | A1 | * | 8/2011 | Urano ............................ 384/473 |
| 2012/0301065 | A1 | | 11/2012 | Mori et al. |

FOREIGN PATENT DOCUMENTS

| | | |
|---|---|---|
| JP | A-2005-106245 | 4/2005 |
| JP | A-2006-105345 | 4/2006 |
| JP | A-2006-226427 | 8/2006 |
| JP | A-2009-236142 | 10/2009 |
| WO | WO 2010/004697 A1 | 1/2010 |

OTHER PUBLICATIONS

Jul. 30, 2014 Search Report issued in European Patent Application No. 14160633.5.

* cited by examiner

*Primary Examiner* — Thomas R. Hannon
(74) *Attorney, Agent, or Firm* — Oliff PLC

(57) ABSTRACT

A rolling bearing unit includes: a rolling bearing; a grease reservoir in which grease is reserved; an outer ring spacer disposed adjacent to an outer ring of the rolling bearing; and a bellows-shaped grease medium that connects a second side wall that defines the grease reservoir on the outer ring spacer side, to a step portion of the outer ring. The grease medium is disposed so as to be impregnated with a base oil contained in the grease.

8 Claims, 3 Drawing Sheets

ROLLING BEARING UNIT

INCORPORATION BY REFERENCE

The disclosure of Japanese Patent Application No. 2013-058631 filed on Mar. 21, 2013 including the specification, drawings and abstract is incorporated herein by reference in its entirety.

BACKGROUND OF THE INVENTION

1. Field of the Invention

The invention relates to a rolling bearing unit.

2. Description of Related Art

As a bearing used for, for example, a spindle of a machine tool, there has been known a bearing including a lubrication mechanism of grease sealed type. As a rolling bearing unit including such a bearing of grease sealed type, there has been known a rolling bearing unit configured as described in Japanese Patent Application Publication No. 2006-105345 (JP 2006-105345 A). The rolling bearing unit described in JP 2006-105345 A includes a grease reservoir and a clearance forming piece that defines a clearance which extends from the grease reservoir to a position near a raceway surface of a bearing ring and through which a base oil of grease is guided to the bearing ring under a capillary action.

The inventor of the invention carried out an endurance test with the use of experimental equipment that simulates a rolling bearing unit of grease sealed type. As a result, the inventor found that there is a possibility that a void (crack) will be formed in grease when a thermal history of the grease exceeds a predetermined time. In addition, the inventor found that the narrower the space in which the grease is filled, the higher the frequency of formation of such a void. For example, as illustrated in FIG. 4, if a clearance S2 defined by an inner peripheral face 202 of an outer ring spacer 201, an inner peripheral face 204 of an outer ring 203 and a clearance forming piece 205 is narrow, there is a possibly that a void S will be formed in grease G provided in the clearance S2. If such a void S is formed, the grease G in the grease reservoir 207 and the grease G applied to the outer ring 203 are isolated from each other. This causes a possibility that the supply of a base oil contained in the grease G to the outer ring 203 will be interrupted, and as a result, the supply of the grease G onto a raceway surface (not illustrated) of the outer ring 203 will be insufficient.

In a machine tool required to have high speed rotation performance, it is necessary to continue to supply grease into a bearing with no interruption.

SUMMARY OF THE INVENTION

One object of the invention is to provide a longer-life rolling bearing unit configured to make it possible to continue supplying a base oil contained in grease to a bearing even if a void is formed in the grease.

An aspect of the invention relates to a rolling bearing unit including: a rolling bearing including an inner ring, an outer ring, and a plurality of rolling elements disposed between the inner ring and the outer ring; spacers including an inner ring spacer disposed adjacent to the inner ring and an outer ring spacer disposed adjacent to the outer ring; and a grease reservoir in which grease is reserved, and which is formed at a fixed ring spacer out of the inner ring spacer and the outer ring spacer. The fixed ring spacer out of the inner ring spacer and the outer ring spacer has a first inner wall and a second inner wall that are opposed to each other in an axial direction of a shaft on which the rolling bearing is supported so as to define the grease reservoir. The rolling bearing unit comprises a grease medium that connects a fixed ring out of the inner ring and the outer ring to the second inner wall (inner wall face of the side wall) located so as to be opposed to the fixed ring in the axial direction. The grease medium is able to be impregnated with a base oil contained in the grease.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
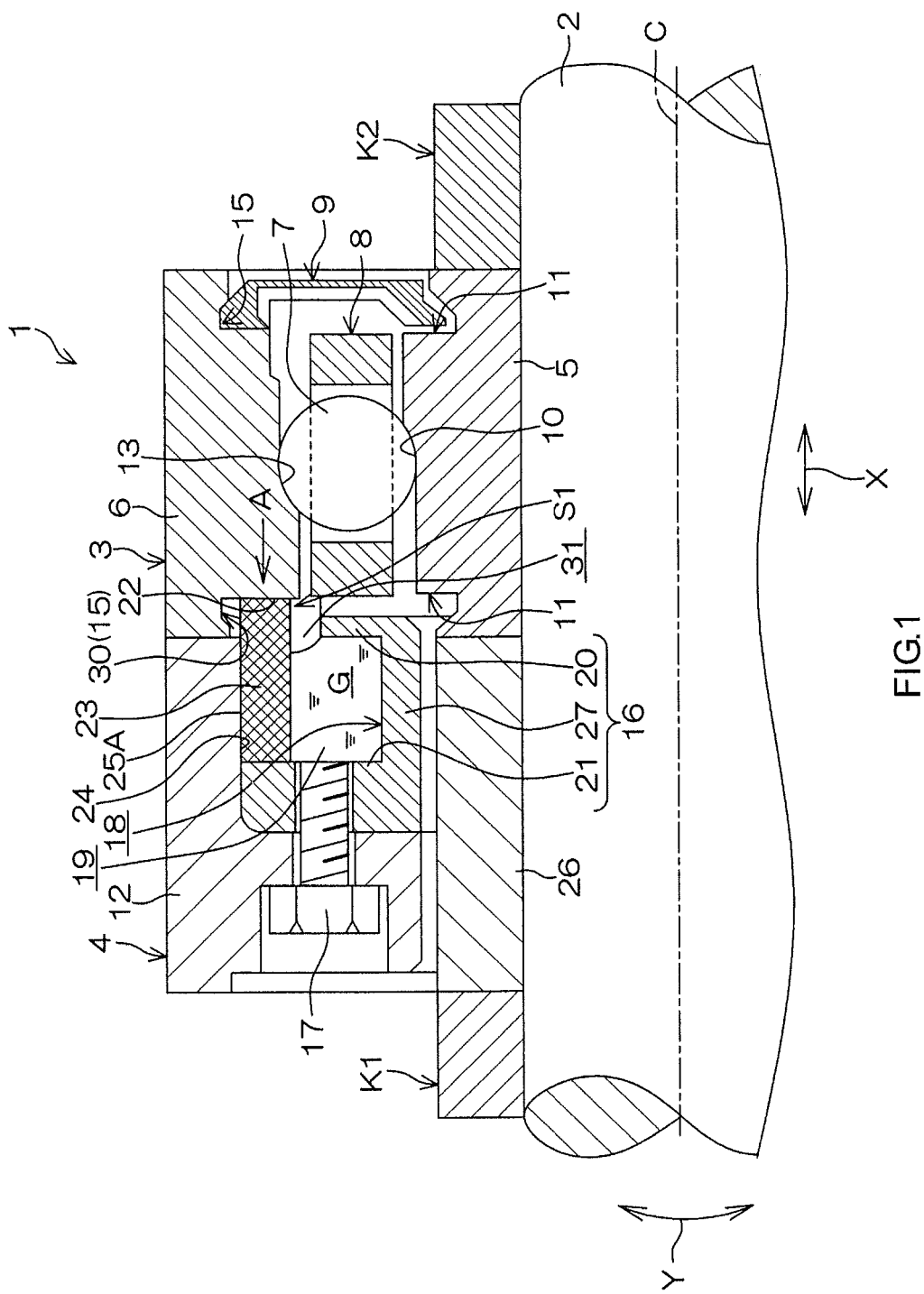
FIG. 1 is a sectional view of a rolling bearing unit according to an embodiment of the invention.
Figure 2:
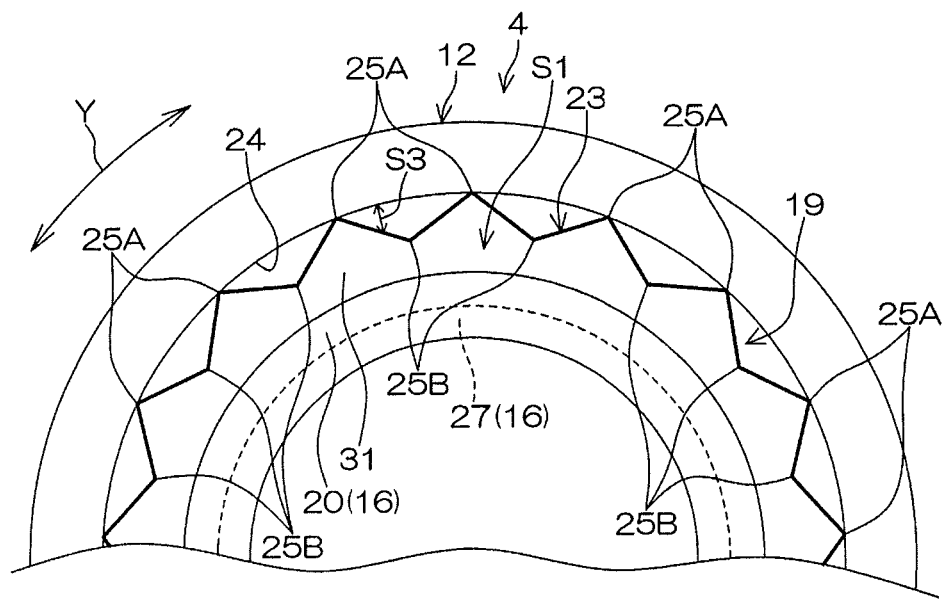
FIG. 2 is a view of the rolling bearing unit as viewed from the direction of an arrow A.

Hereinafter, example embodiments of the invention will be described with reference to the accompanying drawings. FIG. 1 is a sectional view of a rolling bearing unit 1 according to an embodiment of the invention. FIG. 2 is a view of the rolling bearing unit 1 as viewed from the direction of an arrow A. The rolling bearing unit 1 is used to hold, for example, a main spindle 2 (shaft on which a rolling bearing is supported) of a machine tool. As illustrated in FIG. 1 and FIG. 2, the rolling bearing unit 1 includes a rolling bearing 3 that is an angular contact ball bearing, and a grease reservoir device 4 that is provided adjacent to the rolling bearing 3.

As illustrated in FIG. 1, the rolling bearing 3 includes an inner ring 5 (rotatable ring among inner and outer rings), an outer ring 6 (fixed ring among the inner and outer rings), rolling elements 7, a cylindrical cage 8, and a seal 9. The inner ring 5 is fitted, at its inner periphery, onto the main spindle 2. The outer ring 6 is fitted, at its outer periphery, to a housing (not illustrated) of the machine tool. The rolling elements 7 are interposed between the inner ring 5 and the outer ring 6. The cage 8 holds the rolling elements 7 arranged at predetermined intervals in a circumferential direction Y. The seal 9 seals an annular space defined between the inner ring 5 and the outer ring 6, at one end (the right end in FIG. 1) of the annular space in an axial direction X (the axial direction of the main spindle 2). In FIG. 1, the angular contact ball bearing is used as the rolling bearing 3. However, instead of the angular contact ball bearing, a deep groove ball bearing may be used, or a cylindrical roller bearing, a tapered roller bearing or the like may also be used.

An inner ring raceway surface 10, on which the rolling elements 7 are rolled, is formed in an outer peripheral face of the inner ring 5 at its center portion in the axial direction X. First sealing grooves 11 are formed in the outer peripheral face of the inner ring 5 at its respective end portions in the axial direction X. An inner peripheral portion (seal lip) of the seal 9 is fitted in the first sealing groove 11 that is located on one side (the right side in FIG. 1) in the axial direction. An outer ring raceway surface 13, on which the rolling elements 7 are rolled, is formed in an inner peripheral face of the outer ring 6 at its center portion in the axial direction X. Second sealing grooves 15 are formed in the inner peripheral face of the outer ring 6 at its respective end portions in the axial direction X. An outer peripheral portion of the seal 9 is fitted in the second sealing groove 15 that is located on the one side (the right side in FIG. 1) in the axial direction X.

The second sealing groove 15 on the other side (the left side in FIG. 1) in the axial direction X serves as an annular groove 30 in which grease G is reserved. The annular groove 30 is defined by a step portion 22 formed at the other end portion (the left side portion in FIG. 1) of the outer ring 6. The step portion 22 is connected to the other end face (the left end face in FIG. 1) of the outer ring 6. The grease G is provided in the annular groove 30 in advance. The grease reservoir device 4 includes an outer ring spacer 12 (fixed ring spacer among inner and outer ring spacers) and an oil reservoir ring 16. The oil reservoir ring 16 is secured to the outer ring spacer 12 with bolts 17. The outer ring spacer 12 is a cylindrical member that is in contact with the other end face (the left end face in FIG. 1) of the outer ring 6, and that is fitted at its outer periphery to the housing (not illustrated) of the machine tool. The outer ring spacer 12 and the outer ring 6 are positioned in the axial direction X by positioning members (not illustrated) secured to the housing (not illustrated).

An inner ring spacer 26 (rotatable ring spacer among the inner and outer ring spacers) is disposed adjacent to the other end face (the left end face in FIG. 1) of the inner ring 5 in the axial direction X. The inner ring spacer 26 and the inner ring 5 are positioned in the axial direction X, respectively, by spacers K1, K2 secured to the main spindle 2. The oil reservoir ring 16 has a cylindrical shape around a central axis C of the main spindle 2. The oil reservoir ring 16 has a cylindrical bottom portion 27, an annular disc-shaped first side wall 20, and an annular disc-shaped second side wall 21. The bottom portion 27 surrounds the outer periphery of the inner ring spacer 26. The first side wall 20 is projected radially outward from one end portion (the right end portion in FIG. 1) of the bottom portion 27. The second side wall 21 is projected radially outward from the other end portion (the left end portion in FIG. 1) of the bottom portion 27. An annular oil groove 18 that is opened at its outer peripheral side is defined by an outer peripheral wall face of the bottom portion 27, an inner wall face (first inner wall) of the first side wall 20 and an inner wall face (second inner wall) of the second side wall 21. A grease reservoir 19 that is an annular space in which the grease G is reserved is defined by the oil groove 18 and an inner peripheral face 24 of the outer ring spacer 12 (fixed peripheral face among the peripheral faces of the inner and outer ring spacers).

The first side wall 20 of the oil reservoir ring 16 is located in the rolling bearing 3, that is, located between the inner ring 5 and the outer ring 6. More specifically, the first side wall 20 is located radially inward of the annular groove 30. The outer peripheral end of the first side wall 20 has a diameter that is set smaller than the inner diameter (diameter of the inner peripheral face 24) of the outer ring spacer 12, and thus the oil groove 18 is opened at its outer peripheral side. Specifically, an opening 31 of the grease reservoir 19 is defined between one end (the right end in FIG. 1) of the inner peripheral face 24 of the outer ring spacer 12 and the outer peripheral end of the first side wall 20. The opening 31 is adjacent to the second sealing groove 15 of the outer ring 6. An annular clearance S1 is defined by the opening 31 and the annular groove 30. The annular clearance S1 provides communication between an outer peripheral portion of the grease reservoir 19 and the second sealing groove 15.

As the grease G, for example, a grease formed of a thickener such as a urea compound, a Ba complex soap or a Li complex soap, and a base oil such as ester or polyalphaolefin may be used. A grease medium 23 is placed between the second side wall 21 of the oil reservoir ring 16 and the step portion 22 of the outer ring 6 to connect the grease G in the grease reservoir 19 and the grease G in the annular groove 30 to each other. The grease medium 23 is made of nonwoven fabric (felt). In other words, the grease medium 23 is a solid body having elasticity. The grease medium 23 has a cylindrical shape around the central axis C to surround the entire outer periphery of the oil groove 18. Note that not only nonwoven fabric but also a material which can be impregnated with the base oil, such as paper or fibers, may be used as the material of the grease medium 23.

As illustrated in FIG. 2, the grease medium 23 has a bellows-shape, that is, the grease medium 23 is formed of radially outwardly folded portions 25A and radially inwardly folded portions 25B that alternate along the circumferential direction Y. In other words, the shape of the grease medium 23 is formed of successive chevrons (inverted V-shapes) in a section orthogonal to the axial direction X. The radially inwardly folded portions 25B of the grease medium 23 are arranged on a circle around the central axis C of the main spindle 2. The radially outwardly folded portions 25A of the grease medium 23 are arranged on a circle that is concentric with the aforementioned circle but has a diameter larger than that of the aforementioned circle. Ridges of the radially outwardly folded portions 25A and ridges of the radially inwardly folded portions 25B are extended in the axial direction X. Note that, for example, the inner ring spacer 26 is not illustrated in FIG. 2.

The grease medium 23 is arranged so as to extend over the outer peripheral portion of the grease reservoir 19 inside the outer ring spacer 12 and the annular clearance S1 inside the outer ring 6. With this arrangement, the radially outwardly folded portions 25A of the grease medium 23 are in contact with the inner peripheral face 24 of the outer ring spacer 12. With this arrangement, one end (the right end in FIG. 1) of the grease medium 23 in the axial direction X is in contact with the step portion 22 of the outer ring 6, at its entire region in the circumferential direction Y, and the other end (the left end in FIG. 1) of the grease medium 23 in the axial direction X is in contact with the inner wall face of the second side wall 21 of the oil reservoir ring 16, at its entire region in the circumferential direction Y. Thus, the base oil contained in the grease G can be more reliably supplied to the step portion 22. In other words, the grease medium 23 is held in the axial direction X between the second side wall 21 of the outer ring spacer 12 and the step portion 22 of the outer ring 6 while the grease medium 23 is accommodated in both the outer peripheral portion of the grease reservoir 19 and the annular clearance S1. Thus, the positioning of the grease medium 23 in the axial direction X is accomplished. Thus, the grease medium 23 is attached to the outer ring spacer 12 and the outer ring 6 with no backlash.

The grease medium 23 can be impregnated with the base oil contained in the grease G in the grease reservoir 19. The grease G in the grease reservoir 19 and the grease G in the annular groove 30 are connected to each other by the base oil impregnated into the grease medium 23. As the base oil contained in the grease G in the annular groove 30 is consumed, the base oil in the grease G reserved in the grease reservoir 19 is transferred and supplied to the grease G in the annular groove 30.

Then, the base oil contained in the grease G reserved in the annular groove 30 is drawn and guided onto the outer ring raceway surface 13. Thus, the base oil contained in the grease G moved into the second sealing groove 15 is continuously supplied to the outer ring raceway surface 13. As a result, the outer ring raceway surface 13, the inner ring raceway surface 10 and the rolling elements 7 are maintained in a satisfactory lubricated state over a long period of time.

Figure 4:
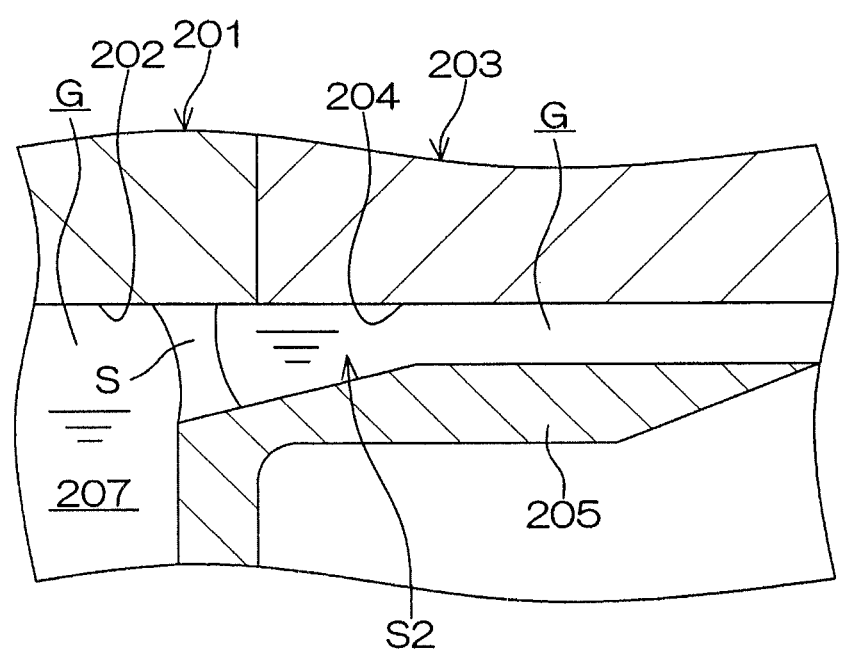
FIG. 4 is an enlarged sectional view illustrating a configuration provided with no grease medium.

According to the present embodiment, the bellows-shaped grease medium 23 is placed so as to extend between the inner wall face of the second side wall 21 of the oil reservoir ring 16 and the step portion 22 of the outer ring 6. The grease medium 23 connects the inner wall face of the second side wall 21 to the step portion 22 of the outer ring 6. The grease medium 23 can be impregnated with the base oil contained in the grease G. Thus, the base oil contained in the grease G reserved in the grease reservoir 19 is supplied to the step portion 22 of the outer ring 6 through the grease medium 23. No void S (crack, refer to FIG. 4) is formed in the base oil impregnated in the grease medium 23.

Because the grease medium 23 connects the inner wall face of the second side wall 21 to the outer ring 6, the grease G reserved in the grease reservoir 19 is made into contact with the grease medium 23 over the entire region of the grease reservoir 19 in the axial direction X. Even if a void S (refer to FIG. 4) is formed in the grease at an intermediate position of the grease reservoir 19 in the axial direction X (more specifically, even if a void S is formed near the inner wall face of the second side wall 21), the grease medium 23 is impregnated with the base oil from another position in the axial direction X, at which no void S is formed. The base oil of the grease G impregnated into the grease medium 23 is supplied to the step portion 22 of the outer ring 6 via the grease medium 23. Thus, even if a void S is formed in the grease G reserved in the grease reservoir 19, the supply of the base oil to the step portion 22 of the outer ring 6 is continued with no interruption. Therefore, it is possible to more reliably lubricate the rolling bearing 3, thus making it possible to obtain the rolling bearing unit 1 having a longer life.

Because the grease medium 23 surrounds the entire periphery of the grease reservoir 19, the base oil contained in the grease G can be supplied to the outer ring 6 over the entire peripheries of both the outer ring spacer 12 and the outer ring 6. Thus, it is possible to further reliably lubricate the rolling bearing 3. Because the shape of the grease medium 23 is formed of successive chevrons (inverted V-shapes) in a section orthogonal to the axial direction X, the size of the clearance between the grease medium 23 and the inner peripheral face 24 of the outer ring spacer 12 varies depending on a position in the circumferential direction Y. For example, if the section of the grease medium 23 in a direction orthogonal to the axial direction X is set along the inner peripheral face 24 of the outer ring spacer 12, there is a possibility that voids S (refer to FIG. 4) will be formed in a clearance S3 between the grease medium 23 and the inner peripheral face 24 of the outer ring spacer 12 over a plurality of regions in the circumferential direction Y when the clearance S3 is narrow.

However, in the present embodiment, the size of the clearance S3 between the inner peripheral face 24 of the outer ring spacer 12 and the grease medium 23 varies depending on a position in the circumferential direction Y, and thus a void S (refer to FIG. 4) is hardly formed at a position where the clearance S3 is large. Thus, it is possible to prevent formation of voids S (refer to FIG. 4) in the clearance S3 over a plurality of regions in the circumferential direction Y. The grease medium 23 is held between the second side wall 21 of oil reservoir ring 16 and the outer ring 6 with the outer ring spacer 12 disposed adjacent to the outer ring 6. Thus, the grease medium 23 is positioned in the axial direction X by positioning the outer ring spacer 12 with respect to the outer ring 6. Thus, the grease medium 23 can be positioned in the axial direction X with respect to the outer ring spacer 12 and the outer ring 6 without provision of any extra attaching member.

When the grease medium 23 is attached to the outer ring spacer 12 and the outer ring 6, the radially outwardly folded portions 25A of the grease medium 23 can be made into contact with the inner peripheral face 24 of the outer ring spacer 12, and thus the grease medium 23 can be easily attached to the outer ring spacer 12 and the outer ring 6 while being positioned in the circumferential direction Y. While one embodiment of the invention has been described above, the invention may be implemented in various other embodiments.

Figure 3:
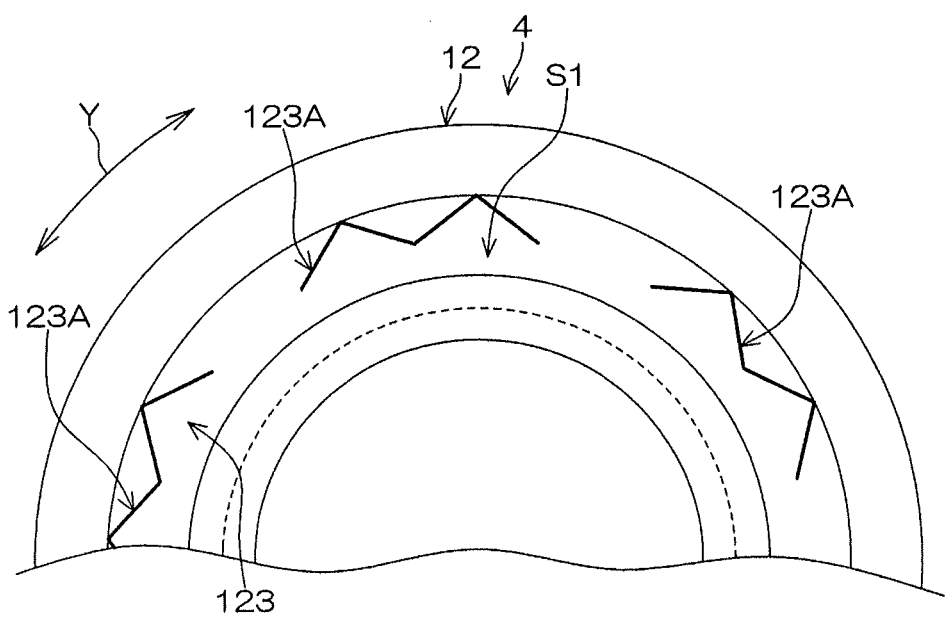
FIG. 3 is a view illustrating a modified example of a grease medium.

As illustrated in FIG. 3, there may be employed a grease medium 123 formed of a plurality of segments 123A that are separated from each other in the circumferential direction Y. Each of the segments 123A is disposed in a circular arc-shape along the circumferential direction Y, and has a bellows-shape, that is, each of the segments 123A is formed of radially outwardly folded portions and radially inwardly folded portions that alternate along the circumferential direction Y. In other words, each segment 123A is formed of successive chevrons (inverted V-shapes) in a section orthogonal to the axial direction X (see FIG. 1). One end (the right end in FIG. 1) of each of the segments 123A is in contact with the step portion 22 (refer to FIG. 1) of the outer ring 6 and the other end (the left end in FIG. 1) of the segment 123A is in contact with the inner wall face of the second side wall 21 (refer to FIG. 1) of the oil reservoir ring 16 in the state where each of the segments 123A is arranged so as to extend over the outer peripheral portion of the grease reservoir 19 (refer to FIG. 1 together with FIG. 3) inside the outer ring spacer 12 and the annular clearance S1 (refer to FIG. 1 together with FIG. 3) inside the outer ring spacer 12.

Note that, in the embodiments described above, the inner ring 5 and the inner ring spacer 26 serve as a rotatable ring and a rotatable ring spacer that are rotated together with the main spindle 2, whereas the outer ring 6 and the outer ring spacer 12 serve as a fixed ring and a fixed ring spacer that are fixed to the housing (not illustrated) and that are stationary members. However, the invention may also be applied to a case where the outer ring 6 and the outer ring spacer 12 serve as a rotatable ring and a rotatable ring spacer, whereas the inner ring 5 and the inner ring spacer 26 serve as a fixed ring and a fixed ring spacer. In this case, the grease reservoir 19 is formed on the inner ring spacer 26, and the grease medium 23, 123 connects an inner wall face (corresponding to the inner wall face of the second side wall 21) that defines the grease reservoir 19 to the inner ring 5.

Further, the invention may be implemented in various modified embodiments within the scope of the appended claims.

What is claimed is:
1. A rolling bearing unit comprising:
   a rolling bearing including an inner ring, an outer ring, and a plurality of rolling elements disposed between the inner ring and the outer ring;
   spacers including an inner ring spacer disposed adjacent to the inner ring and an outer ring spacer disposed adjacent to the outer ring; and
   a grease reservoir in which grease is reserved, and which is formed at a fixed ring spacer out of the inner ring spacer and the outer ring spacer, wherein
   the fixed ring spacer has a first inner wall and a second inner wall that are opposed to each other in an axial direction of a shaft on which the rolling bearing is supported so as to define the grease reservoir, and the rolling bearing unit comprises a grease medium that is embedded in the grease and that connects a fixed ring out of the inner ring and the outer ring to the second inner wall located so as to be opposed to the fixed ring in the axial direction, the grease medium being able to be impregnated with a base oil contained in the grease.

2. The rolling bearing unit according to claim 1, wherein a shape of the grease medium in a section orthogonal to the axial direction is a chevron shape or an inverted chevron shape.

3. The rolling bearing unit according to claim 2, wherein the grease medium is held between the second inner wall and the fixed ring in a state where the fixed ring spacer is disposed adjacent to the fixed ring.

4. The rolling bearing unit according to claim 1, wherein a shape of the grease medium is formed of successive chevrons or successive inverted chevrons in a section orthogonal to the axial direction.

5. The rolling bearing unit according to claim 4, wherein the grease medium is held between the second inner wall and the fixed ring in a state where the fixed ring spacer is disposed adjacent to the fixed ring.

6. The rolling bearing unit according to claim 1, wherein the grease medium is held between the second inner wall and the fixed ring in a state where the fixed ring spacer is disposed adjacent to the fixed ring.

7. The rolling bearing unit according to claim 1, wherein the grease medium extends at least from the second inner wall to the first inner wall so as to span the entire grease reservoir in the axial direction.

8. The rolling bearing unit according to claim 1, wherein the grease medium is disposed, in a radial direction of the shaft, farther from the shaft than a radially innermost portion of the grease reservoir.

\* \* \* \* \*